United States Patent Office 3,037,955
Patented June 5, 1962

3,037,955
RESINOUS COATING COMPOSITIONS AND METH-
ODS OF COATING MATERIALS WITH THEM
Everett F. Carman, Fort Washington, Pa., assignor to
Rohm & Haas Company, Philadelphia, Pa., a corpora-
tion of Delaware
No Drawing. Filed May 29, 1958, Ser. No. 738,603
9 Claims. (Cl. 260—30.6)

The present invention concerns coating compositions and is particularly concerned with the production of coatings from acrylic resins which remain in permanently thermoplastic condition. It is an object of the invention to provide compositions which are adapted to form tough, flexible coatings which have good adhesion to the substrates and good resistance to moisture. An important object of the invention is to provide coating compositions formed of acrylic polymers which can develop good adhesion to the substrate and good resistance to moisture without requiring the use of high temperatures for drying the coating after application to the substrate.

Thermoplastic acrylic polymer solutions in organic solvents are used for many coating purposes. The polymers of methyl methacrylate are particularly desirable because of outdoor durability but frequently have inadequate adhesion to some substrates, such as smooth metals or even over some of the primer coatings conventionally employed on metals. In some cases adequate adhesion can be obtained only if the polymer contains in its molecule, units derived from special monomers having groups of such chemical constitution as to improve the adhesion of the polymer to any particular substrate or group of substrates and the coatings obtained are heated to about 300° F. or higher either during or after the drying of the coating. In using this latter technique, it is also generally the rule that subjection of the coating to temperatures of 300° F. or higher produces good adhesion but frequently the adhesion is inadequate if lower temperatures of drying are used and the drying is not followed by heating at 300° F. or higher. There are, however, many applications where lower temperatures of drying such as a temperature range from room temperature up to 180° F. are desired or required. The coatings obtained from the acrylic polymers on drying at these relatively low temperatures show progressively decreasing adhesion to the substrate, particularly when smooth metals are involved.

In accordance with the present invention, it has been found that the incorporation of a small proportion, such as from ½ to 3% on the weight of copolymer, of certain acids or an anhydride of one of these acids into the solution of the acrylic polymers serves to markedly improve the adhesion obtained from such solutions when they are dried at low temperatures from room temperature up to 180° F. Of course, such compositions can also be applied and dried at temperatures above 180° such as at 300° F. or higher with at least as good adhesion in the coating as would be obtained from the application of the polymer solution without the acid.

The compositions of the present invention accordingly comprise a solution in an organic solvent of a polymer of an acrylic ester or nitrile as defined more particularly hereinafter which solution also contains ½ to 3% of certain acids hereinafter defined or an anhydride of one of these acids, the proportion of acid just specified being based on the weight of copolymer.

The polymers may be those formed from methyl methacrylate or ethyl methacrylate, as a large proportion of the polymer. At least 30%, and preferably at least 50% by weight of one or both of these monomers is present in the polymer and the total amount of the two esters may be up to about 99.5% by weight of the polymer. The content of acrylonitrile or methacrylonitrile or both together in the polymer may be up to 30% by weight. When the total amount of methyl methacrylate and/or ethyl methacrylate is less than 40%, the copolymer should contain at least sufficient acrylonitrile or methacrylonitrile or of a mixture of them to bring the total weight of these four monomers or of any two or more of them up to 40%. The polymer may contain up to 60% by weight of vinyl acetate, styrene, a $C_1$- to $C_4$-alkyl styrene, such as vinyl toluene (any of o-, m-, or p-methyl styrene or any mixture thereof), an ester of methacrylic acid with a monohydric alcohol of the formula ROH (containing no other functional group) wherein R is benzyl, cyclohexyl, phenyl, bornyl, isobornyl, or an alkyl group having 3 to 18 carbon atoms, an ester of acrylic acid with a monohydric alcohol of the formula ROH (containing no other functional group) where R is benzyl, cyclohexyl, phenyl, bornyl, isobornyl, or an alkyl group having 1 to 18 carbon atoms, or of a mixture of these comonomers. Desirably, the polymer also contains an appreciable amount of a comonomer which is of such character that it produces relatively soft homopolymers as compared to the homopolymers of methyl methacrylate, or ethyl methacrylate. Examples of such comonomers include the propyl methacrylates, the butyl methacrylates, amyl methacrylates, or any of the methacrylates of higher alcohols such as hexyl, cyclohexyl, octyl, dodecyl, or octadecyl alcohols. Other softening comonomers include the esters of acrylic acid with alcohols having from 1 to 18 carbon atoms such as methyl, ethyl, propyl, butyl, hexyl, benzyl, cyclohexyl, octyl, dodecyl, and octadecyl alcohols. Depending upon the particular use and the character of substrate, particularly the porosity, rigidity, and flexibility of the substrate, the copolymer may be formed using various ratios between the hard comonomer such as methyl methacrylate, ethyl methacrylate, or the acrylonitriles, and the soft monomers listed above. For many purposes and particularly for the coating of metals, the comonomers are so selected as to provide coatings obtained by baking at 300° F. for 30 minutes which have a hardness corresponding to 12 to 21 Knoop hardness numbers.

The polymer may also contain up to 10% by weight of a vinyl alkyl ether in which the alkyl group contains 1 to 8 carbon atoms. The polymer may contain up to 5% by weight of any other monoethylenically unsaturated copolymerizable monomer, including acids such as acrylic acid, methacrylic acid, itaconic acid, maleic acid, fumaric acid, the dimer of methacrylic acid, or the like. The polymer may contain up to 10% of such monomers as contain functional groups (other than carboxyl) containing a reactive hydrogen atom as determined by the Zerewitinoff method (Ber. 40, 2023 (1907); 41, 2236 (1908); Kohler, J.A.C.S. 49, 3181 (1927)). Examples of such comonomers include hydroxalkyl($C_2$–$C_4$) acrylates and methacrylates, N-hydroxyalkyl($C_1$–$C_4$)- and N,N-di(hydroxyalkyl($C_1$–$C_4$)-acrylamides and -methacrylamides, acrylamide, methacrylamide, N-monoalkyl($C_1$–$C_4$)-acrylamides and -methacrylamides, aminoalkyl($C_2$–$C_4$) acrylates and methacrylates, N-monoalkyl($C_1$–$C_4$)-aminoalkyl-($C_2$–$C_4$) acrylates and methacrylates, N-aminoalkyl($C_2$–$C_4$)-acrylamides and -methacrylamides, N-monoalkyl-($C_1$–$C_4$)-aminoalkyl($C_2$–$C_4$)-acrylamides and -methacrylamides, and compounds of formula I

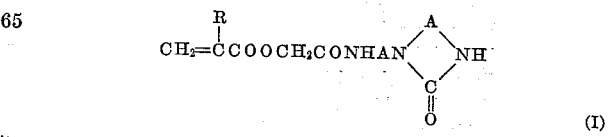

(I)

where R is selected from the group consisting of hydrogen and methyl, and

A is an alkylene group having 2 to 3 carbon atoms. The compounds of Formula I contain amide groups and are substituted 2-imidazolidinones or substituted tetrahydro-2-pyrimidinones. Certain of them may also be conveniently named as derivatives of N,N'-ethyleneurea or N,N'-trimethyleneurea.

Copolymers containing a small proportion of a monomer of Formula I, such as about ½ to 8 mol percent thereof, show improved adhesion on numerous substrates, including smooth metal substrates, when heated to about 300° F. or higher for 30 minutes during the drying.

The polymers of Formula I and their preparation are disclosed in United States Patent 2,881,155, April 7, 1959. The polymers may contain up to 10% of one or more comonomers selected from the group consisting of vinylpyridines, and N,N-dialkyl($C_1$–$C_4$)-aminoalkyl($C_2$–$C_4$) acrylates and methacrylates, which also generally serve to improve adhesion of the polymers to various substrates.

Examples of these various comonomers which can be included in amounts up to 10% by weight of the copolymer include 2-vinylpyridine; 3-vinylpyridine; 4-vinylpyridine; 2-methyl-5-vinylpyridine; 5-methyl-2-vinylpyridine; 4-methyl-2-vinylpyrdidine; 2-ethyl-5-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; Dimethylaminoethyl acrylate and methacrylate
Diethylaminoethyl acrylate and methacrylate
Dimethylaminopropyl acrylate and methacrylate
Diethylaminopropyl acrylate and methacrylate
Dipropylaminoethyl acrylate and methacrylate
Di-n-butylaminoethyl acrylate and methacrylate
Di-sec-butylaminoethyl acrylate and methacrylate
t-Butylaminoethyl acrylate and methacrylate
Dimethylaminoethyl vinyl ether and sulfide
Diethylaminoethyl vinyl ether and sulfide
Aminoethyl vinyl ether and sulfide
Monomethylaminoethyl vinyl ether and sulfide
N,N-dimethylaminoethyl acrylamide and methacrylamide
N,N-diethylaminoethyl acrylamide and methacrylamide
N-[β-(α-methacryloxyacetamido)ethyl]-N,N'-ethyleneurea
N-(β-(α-acryloxyacetamido)ethyl]-N,N'-ethyleneurea
N-[β-(α-acryloxyacetamido)ethyl]-N,N'-trimethyleneurea
N-[β-(α-methacryloxyacetamido)ethyl]-N,N'-trimethyleneurea The acids that provide improved adhesion particularly when the polymer coating is dried at low temperatures are listed in Table A following:

TABLE A

Oxalic acid
Malonic acid
Malic acid
Succinic acid
Glutaric acid
Adipic acid
Phthalic acid
Benzoic acid
Salicylic acid
Butyl benzoic acid
Acetic acid
Dichloroacetic acid
Trichloroacetic acid
Chloroacetic acid
Acrylic acid
Methacrylic acid
Itaconic acid
Levulinic acid
Ethyl hexoic acid
Sebacic acid
p Toluene sulphonic acid
Pyromellitic acid
Butyl phosphoric acid Table A—Continued Trimesic acid
Maleic acid
Tetrachlorophthalic acid
Hexachlorotetrahydrophthalic acid
Phosphoric acid
Sulfuric acid
Dimethyl ester of pyromellitic acid
Monobutyl ester of oxalic acid Anhydrides, such as those of maleic acid, succinic acid and tetrachlorophthalic acid, are also quite effective. The preferred acids are those of Table B following:

TABLE B

Butylphosphoric acid
Pyromellitic acid
Trimesic acid
Dimethyl ester of pyromellitic acid
Tetrachlorophthalic acid These acids have the outstanding characteristic of not increasing the sensitivity of the coatings to humidity. From the standpoint of cost, maleic acid and its anhydride, and succinic acid and its anhydride, are preferred, but these acids tend to increase the sensitivity to humidity appreciably so they should be used only in making coatings which will not be subjected to serious humidity conditions. They are suitable for coatings on articles, such as metal or wood cabinets or appliances used inside in well-ventilated, reasonably dry rooms. The preferred acids of Table B can be used to coat any articles subjected to interior or exterior use. The other acids in Table A are useful in place of the maleic acid or the like for making coatings on articles used inside reasonably dry atmospheres.

Suitable solvents include one or more of the following: toluene, xylenes, methanol, ethanol, isopropanol, ethyl acetate, butyl acetate, amyl acetate, ethoxyethyl acetate, butoxyethyl acetate, methoxyethyl acetate, acetone, methyl ethyl ketone, methyl isopropyl ketone, methyl isobutyl ketone, dimethyl formamide, dimethyl acetamide, acetonitrile, nitromethane, and nitroethane. The solvents are selected or mixed in such proportions as to provide a medium in which the copolymer is sufficiently soluble and in which the acid is also soluble to provide a coating composition of suitable concentration and viscosity for application in any suitable way, such as brushing, spraying, dipping, and so on.

Desirably, the polymer may be prepared by solution polymerization technique directly in the solvent medium desired either at the proper concentration for application in coating or at some higher concentration from which the coating application may simply be obtained by dilution. Of course, polymerization may be effected in any other suitable way, such as by emulsion, suspension, or bulk techniques in any of the manners disclosed in the patent application referred to hereinabove. When the polymer is prepared in any of the other ways just mentioned, it is merely necessary to dissolve the polymer that is obtained by the other techniques in a suitable solvent. In the case of the bulk technique, solution in the organic solvent may be performed directly; whereas in the case of emulsion and suspension techniques, the polymer is separated from the water before dissolution from the organic solvent.

Polymerization by bulk or solution techniques is generally preferred since the polymer obtained thereby is generally of a molecular weight most suitable for coating applications. While the polymers employed in the coating compositions may have molecular weights ranging from about 10,000 up to several million, it is generally preferred to employ polymers having molecular weights from about 50,000 to 200,000 viscosity average. The solution technique of polymerization generally results in polymers having molecular weights in this preferred range. The details of polymerization are not part of the present invention. The polymers may be prepared in the manner disclosed in the patent referred to hereinabove and the disclosure of the polymerization procedures therein is incorporated herein by reference.

The acid or anhydride may be introduced into the solution of the polymer at any time before application of the coating composition to the substrate. As stated previously, the amount may be from about ½ to 3% based on the weight of the polymer. Generally, however, the maximum benefits are obtained when about 1% of acid is employed on the weight of the polymer. The use of an excess over 1% does not generally increase the benefits, and the use of more than 3% of acid generally has the disadvantage of rendering the coating excessively sensitive to moisture. It appears that the acids referred to are quite unique in their capacity to improve adhesion obtained in coatings which are dried at relatively low temperatures. Numerous acids lack the ability to increase the adhesive properties in this manner. Surprisingly, copolymerization of maleic acid has been found incapable of producing the increased adhesion obtained by the mere introduction of one of the acids mentioned hereinabove.

Pigments, dyes, fillers, and plasticizers may be incorporated in the composition if it is desired to modify the flexibility or to color or modify the translucency of the coating. The amount of pigment may be from ½ to 150% by weight of the polymer.

The composition may be applied by spraying, brushing, dipping, by rollers, or in any other suitable way. The concentration may be varied depending upon the manner of application, the substrate to which the coating is applied, and the thickness of the coating desired. In general, the concentration may vary from 2 to 25% by weight of polymer. In most applications the preferred concentration is from 8 to 15% by weight of polymer.

The coatings may be applied to various substrates such as aluminum, brass, steel, iron, copper, or other metals to provide protective lacquers thereon. The application to aluminum frames of storm sash and storm doors is quite advantageous. The coatings may be applied to other substrates such as glass, stone, concrete, and cement, including asbestos cement products, such as shingles and sidings. The coatings may also be applied to wood, leather, paper, and textiles. In the case of application to such flexible materials as leather, paper, and textiles, the proportion of soft comonomer should generally be higher than would be employed for the coating of rigid substrates and the coatings should have Knoop hardness numbers of less than 12, preferably from 7 down to 1 or even less.

In the following examples which are illustrative of the present invention, the parts and percentages are by weight unless otherwise specifically indicated. The adhesion is determined on a Standard Arco Microknife made by Gardner Laboratories, Inc., but the values given hereinafter are relative, being derived from the actual values obtained on the Microknife so that higher values indicate greater adhesion, the adhesion of the film obtained from a given copolymer without the addition of an acid being arbitrarily assigned a value of 1 in each case.

Example 1

To a solution in 60 parts by weight of toluene containing 40 parts by weight of a copolymer of about 72% by weight of ethyl methacrylate and about 28% by weight of methyl acrylate, there is added 0.4 part of maleic acid (1% by weight of the copolymer). This solution is diluted to a concentration of 20% by weight of copolymer and coated on a panel of cold-rolled steel. It is dried at room temperature and then heated for 30 minutes at 180° F. A similar coating is prepared on cold-rolled steel from the same copolymer solution but omitting the maleic acid. The relative Microknife values of adhesion were 2.0 for the coating derived from the maleic acid-containing solution as compared to a value of 1 for the other solution.

Similar improvement in adhesion is obtained with copolymers of ethyl methacrylate and methyl acrylate in approximately the proportions given and in which from ½ to 3% of methacrylic acid or acrylic acid are included in the copolymer.

Example 2

Coatings on cold-rolled steel are obtained by the procedure of Example 1 except that the copolymer is replaced with a copolymer of about 55% of methyl methacrylate and about 45% of ethyl acrylate. As compared to a Microknife value of 1 assigned to a coating obtained from the same polymer solution without maleic acid, the coating obtained with the maleic acid has a Microknife value of 1.42.

Similar improvement is obtained using the same proportion of maleic acid in a toluene solution of a copolymer of about 40% methyl methacrylate and about 60% of butyl methacrylate.

Example 3

A pigmented lacquer is prepared using 55 parts of the copolymer of Example 1, 45 parts of titanium dioxide, 300 parts of toluene, and 0.55 part of phosphoric acid. This lacquer is coated on cold-rolled steel, dried at room temperature and heated for 30 minutes at 180° F. The adhesion is found to be markedly improved over the adhesion of coatings obtained in the same way from the same solution but omitting the phosphoric acid.

Example 4

640 parts of a copolymer of about 68.5% of methyl methacrylate, about 29% of ethyl acrylate, and about 2.5% of N-[β-(α-methacryloxyacetamido)ethyl]-N,N'-ethyleneurea is dissolved in 3600 parts of toluene. This solution is divided into 16 aliquot portions. One of the aliquot portions is used as a control; but to the others, there is added 0.4 part of one of the respective acids in Table C. Coatings on cold-rolled steel are prepared from the 16 solutions, dried at room temperature, heated for 30 minutes at 180° F., and the relative values of adhesion as determined by the Microknife are as listed in Table C.

TABLE C

| Acid: | Relative microknife adhesion value |
|---|---|
| Control (no acid) | 1 |
| Malonic acid | 3.4 |
| Succinic acid | 3.4 |
| Glutaric acid | 2.6 |
| Dichloroacetic acid | 2.4 |
| Trichloroacetic acid | 2.8 |
| Chloroacetic acid | 2.5 |
| Pyromellitic acid | 3.8 |
| Butyl phosphoric acid | 3.6 |
| Trimesic acid | 3.4 |
| Maleic acid | 3.3 |
| Tetrachlorophthalic acid | 2.8 |
| Phosphoric acid | 3.6 |
| Maleic anhydride | 3.2 |
| Succinic anhydride | 3.3 |
| Tetrachlorophthalic anhydride | 2.7 |

Example 5

The procedure of Example 1 is repeated substituting a copolymer of 80% of methyl methacrylate with 12% of ethyl acrylate and 8% of methacrylamide. Adhesion of the coatings to cold-rolled steel after drying and heating for 30 minutes at 180° F. is much improved over similar coatings obtained without including maleic acid.

Example 6

The procedure of Example 1 is repeated replacing the maleic acid with 1.2% of butylphosphoric acid (on copolymer) and substituting for the copolymer a copolymer of 30% of acrylonitrile, 30% of methyl methacrylate, 33% of ethyl acrylate, and 7% of dimethylaminoethyl methacrylate. The adhesion to cold-rolled steel is greatly improved as compared to the adhesion obtained when coatings are produced from the same polymer solution except for the omission of the acid.

Example 7

The procedure of Example 1 is repeated substituting pyromellitic acid for the maleic acid and substituting for the copolymer a copolymer of 65% of methyl methacrylate, 32% of ethyl acrylate, and 3% of methacrylic acid. The solution is applied to panels of cold-rolled steel both bare and primed with a priming coating composition formed of a tall oil fatty acid modified epoxy-alkyd obtained by the condensation of an isopropylidene-bis-phenol/epichlorohydrin condensate with phthalic anhydride and glycerol. The adhesion was improved on both types of panels by the presence of the acid in the copolymer solution.

Example 8

The procedure of Example 1 is repeated replacing the maleic acid with a corresponding amount of phosphoric acid and the copolymer with a copolymer of 60% of methyl methacrylate, 35% by weight of ethyl acrylate, and 5% by weight of β-hydroxyethyl methacrylate. The adhesion was greatly improved over the adhesion obtained with a similar polymer solution omitting the acid when applied both to cold-rolled steel which was bare and that primed as in the preceding example.

It is to be understood that changes and variaitons may be made without departing from the spirit and scope of the invention as defined in the appended claims.

I claim:
1. A composition comprising a solution in an organic solvent containing about 2 to 25% by weight, based on the total weight of the solution, of (a) a copolymer containing (A) up to 10% by weight of a copolymerizable compound selected from the group consisting of vinyl-pyridines, N,N-di-($C_1$–$C_4$) alkylamino-($C_2$–$C_4$) alkyl acrylates, N,N-di-($C_1$–$C_4$) alkylamino-($C_2$–$C_4$) alkyl methacrylates, dimethylaminoethyl vinyl ether, dimethylaminoethyl vinyl sulfide, diethylaminoethyl vinyl ether, diethylaminoethyl vinyl sulfide, aminoethyl vinyl ether, aminoethyl vinyl sulfide, monomethylaminoethyl vinyl ether, monomethylaminoethyl vinyl sulfide, hydroxyalkyl ($C_2$–$C_4$) acrylates and methacrylates, N-hydroxyalkyl ($C_1$–$C_4$)-acrylamides, N-hydroxyalkyl ($C_1$–$C_4$)-methacrylamides, N,N-di(hydroxyalkyl ($C_1$–$C_4$)-acrylamides, N,N-dihydroxyalkyl ($C_1$–$C_4$)-methacrylamides, acrylamide, methacrylamide, N-monoalkyl ($C_1$–$C_4$)-acrylamides, N-monoalkyl ($C_1$–$C_4$)-methacrylamides aminoalkyl ($C_2$–$C_4$) acrylates and methacrylates, N-monoalkyl ($C_1$–$C_4$)-aminoalkyl ($C_2$–$C_4$) acrylates and methacrylates, N-monoalkyl ($C_2$–$C_4$)-acrylamides, N-aminoalkyl-($C_2$–$C_4$)-methacrylamides, N-monoalkyl-($C_1$–$C_4$)-amino-alkyl ($C_2$–$C_4$)-acrylamides, N-monoalkyl ($C_1$–$C_4$)-amino-alkyl ($C_2$–$C_4$)-methacrylamides, and compounds of the formula

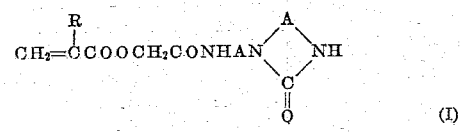

(I)

where R is selected from the group consisting of hydrogen and methyl, and
A is an alkylene group having 2 to 3 carbon atoms
and (B) at least one monomer selected from the group consisting of (1) methyl methacrylate and ethyl methacrylate in an amount up to about 99.5% by weight, (2) vinyl acetate, styrene ($C_1$–$C_4$) alkyl) styrenes, esters of acrylic acid with an alcohol having 1 to 18 carbon atoms and containing no other functional group, and esters of methacrylic acid with an alcohol having 3 to 18 carbon atoms and containing no other functional group in an amount up to about 60% by weight, (3) acrylonitrile and methacrylonitrile in an amount up to 30% by weight, at least sufficient of said nitrile being present when the total amount of (1) is less than 40% by weight to make the total of (1) and (3) at least 40% by weight, (4) vinyl alkyl ethers in which the alkyl group has 1 to 8 carbon atoms in an amount up to 10% by weight, and (5) up to 5% by weight of a copolymerizable monoethylenically unsaturated carboxylic acid selected from the group consisting of acrylic acid, methacrylic acid, itaconic acid, maleic acid, fumaric acid, and the dimer of methacrylic acid, the copolymer containing at least 30% by weight of a monomer selected from the group consisting of methyl methacrylate and ethyl methacrylate, and the proportions of (A), (1), (2), (3), (4), and (5) components above totalling 100%, and (b) from ½ to 3%, based on the weight of the copolymer, of an acid selected from the group consisting of those listed in Table A in the specification.

2. A composition as defined in claim 1 in which the acid is maleic acid.

3. A composition as defined in claim 1 in which the acid is maleic anhydride.

4. A composition as defined in claim 1 in which the acid is butyl phosphoric acid.

5. A composition as defined in claim 1 in which the acid is pyromellitic acid.

6. A composition as defined in claim 1 in which the acid is trimesic acid.

7. A method of coating a substrate which comprises applying to the substrate a solution as defined in claim 1, and drying the coating of the solution on the substrate at a temperature from room temperature up to about 300° F.

8. A method of coating a substrate which comprises applying to the substrate a solution as defined in claim 1, and drying the coating of the solution on the substrate at a temperature from room temperature up to about 180° F.

9. A method which comprises applying to a metal substrate a composition as defined in claim 1, and drying the coating of the solution on the substrate at a temperature from room temperature up to about 300° F.

References Cited in the file of this patent
UNITED STATES PATENTS

| | | |
|---|---|---|
| 2,406,558 | Neumann | Aug. 27, 1946 |
| 2,502,030 | Scheiderbauer | Mar. 28, 1950 |
| 2,503,245 | Coover et al. | Apr. 11, 1950 |
| 2,654,721 | Lytton | Oct. 6, 1953 |
| 2,868,760 | Staicopoulos | Jan. 13, 1959 |
| 2,873,212 | Roeser | Feb. 10, 1959 |
| 2,881,155 | Hankins | Apr. 7, 1959 |